(12) United States Patent
Castrucci et al.

(10) Patent No.: US 7,934,151 B1
(45) Date of Patent: Apr. 26, 2011

(54) SPECIFICATION OF TABLES INCLUDING OBJECTS WITH ARBITRARY FORMATTING

(75) Inventors: Adam Castrucci, Ottawa (CA); Gavin F. McKenzie, Ottawa (CA)

(73) Assignee: Adobe Systems Incorporated, San Jose, CA (US)

( * ) Notice: Subject to any disclaimer, the term of this patent is extended or adjusted under 35 U.S.C. 154(b) by 861 days.

(21) Appl. No.: 11/141,933

(22) Filed: May 31, 2005

(51) Int. Cl.
*G06F 17/00* (2006.01)

(52) U.S. Cl. .......... 715/222; 715/221; 715/234

(58) Field of Classification Search .......... 715/212, 715/213, 221, 222, 227, 234
See application file for complete search history.

(56) References Cited

U.S. PATENT DOCUMENTS

| | | | | |
|---|---|---|---|---|
| 5,280,575 | A * | 1/1994 | Young et al. | 715/255 |
| 5,367,619 | A * | 11/1994 | Dipaolo et al. | 715/221 |
| 5,613,131 | A * | 3/1997 | Moss et al. | 715/236 |
| 6,611,840 | B1 * | 8/2003 | Baer et al. | 715/270 |
| 6,613,099 | B2 * | 9/2003 | Crim | 715/210 |
| 6,922,807 | B1 * | 7/2005 | Miyata | 715/203 |
| 6,968,504 | B2 * | 11/2005 | Broman et al. | 715/234 |
| 6,976,212 | B2 * | 12/2005 | Newman et al. | 715/227 |
| 7,117,433 | B1 * | 10/2006 | Glaser et al. | 715/205 |
| 7,117,435 | B1 * | 10/2006 | Kotler et al. | 715/210 |
| 7,120,866 | B2 * | 10/2006 | Kotler et al. | 715/209 |
| 7,143,339 | B2 * | 11/2006 | Weinberg et al. | 715/212 |
| 7,155,667 | B1 * | 12/2006 | Kotler et al. | 715/210 |
| 7,328,400 | B2 * | 2/2008 | Van Patten Benhase et al. | 715/227 |
| 7,350,141 | B2 * | 3/2008 | Kotler et al. | 715/209 |
| 7,430,711 | B2 * | 9/2008 | Rivers-Moore et al. | 715/221 |
| 7,581,169 | B2 * | 8/2009 | Thomson et al. | 715/223 |
| 7,617,219 | B2 * | 11/2009 | Betancourt et al. | 1/1 |
| 7,870,478 | B1 * | 1/2011 | Chiaro, Jr. et al. | 715/223 |
| 2003/0071848 | A1 * | 4/2003 | Carroll | 345/776 |
| 2003/0084046 | A1 * | 5/2003 | Rogers et al. | 707/10 |
| 2005/0066265 | A1 * | 3/2005 | Kotler et al. | 715/503 |
| 2006/0136808 | A1 * | 6/2006 | Chirilov et al. | 715/503 |
| 2006/0136810 | A1 * | 6/2006 | Truong et al. | 715/507 |
| 2006/0200779 | A1 * | 9/2006 | Taylor | 715/781 |
| 2006/0218483 | A1 * | 9/2006 | Weitzman et al. | 715/503 |

OTHER PUBLICATIONS

Change the column width and row height; Microsoft Office Excel 2003 (help); http://office.microsoft.com/en-us/excel/HP051988131033.aspx.*
Microsoft Word 2003; Form Template included with program; MS Form—Job Description—Exhibit A.pdf.*
Introducing Microsoft® Office InfoPath™ 2003; By: Roger Jennings; Publisher: Microsoft Press; Pub. Date: Jun. 9, 2004; Print ISBN-13: 978-0-7356-1952-4; Relevant passages sent to applicant.*
Special Edition Using Microsoft® Office Access 2003; By: Roger Fennings; Publisher: Que; Pub. Date: Sep. 11, 2003; Print ISBN-10: 0-7897-2952-0.*
Microsoft® Office Access 2003 Inside Track; By: John Pierce; Paul Pardi; Publisher: Microsoft Press; Pub. Date: Jan. 7, 2004; Print ISBN-13: 978-0-7356-1976-0.*

(Continued)

*Primary Examiner* — Doug Hutton
*Assistant Examiner* — Benjamin J Smith
(74) *Attorney, Agent, or Firm* — Van Pelt, Yi & James LLP

(57) ABSTRACT

Specification of tables containing objects is disclosed. In some embodiments, a table object contains one or more row objects as well as one or more objects with arbitrary (i.e. non-row) formatting. Common row and/or column formatting may be inferred and applied to objects associated with rows but not to objects associated with arbitrary formatting.

25 Claims, 6 Drawing Sheets

OTHER PUBLICATIONS

MS Access 2003—Project Plan and Performance Review.pdf—Exhibit B.*

XFA-Template Version 1.0—Gavin F. McKenzie; http://www.w3.org/1999/05/XFA/xfa-template.html; W3C_xfa-template.pdf.*

* cited by examiner

| CELL1 | | | |
|---|---|---|---|
| CELL 1 | CELL 2 | | CELL 3 |
| CELL 1 | CELL 2 | | CELL 3 |
| CELL 1 | CELL 2 | | CELL 3 |

INFORMATION

Full Name : John C.Doe

Telephone : (123) 456-7890

Date of Birth : 11-24-62

Please do not write in this space
Office use only

| CELL 1 | CELL 2 | CELL 3 |
|---|---|---|
| CELL 1 | CELL 2 | CELL 3 |

| DETAIL LINE |
| DETAIL LINE |
| DETAIL LINE |
| DETAIL LINE |

| CELL 1 | CELL 2 | CELL 3 |
|---|---|---|
| CELL 1 | CELL 2 | CELL 3 |

| FIELD 1 | TEXT 1 | FIELD 2 | FIELD 3 | FIELD 4 |
| FIELD 5 | FIELD 6 | TEXT 2 | FIELD 7 | |

| CELL 1 | CELL 2 |

FIG. 1

```
1    <subform layout= "table" columnwidths= "2in 3in 1in" >
2        <subform layout= "row" name= "row1">...nested object...</subform>
3        <subform layout= "row" name= "row2">...nested objects...</subform>
4        <subform layout= "row" name= "row3">...nested objects...</subform>
5        <subform layout= "row" name= "row4">...nested objects...</subform>
6        <subform layout= "position" name= "information">...nested objects...</subform>
7        <subform layout= "row" name= "row5">...nested objects...</subform>
8        <subform layout= "row" name= "row6">...nested objects...</subform>
9        <subform layout= "tb" name= "detail">...nested objects...</subform>
10       <subform layout= "row" name= "row7">...nested objects...</subform>
11       <subform layout= "row" name= "row8">...nested objects...</subform>
12       <subform layout= "lr-tb" name= "data">...nested objects...</subform>
13       <subform layout= "row" name= "row9">...nested objects...</subform>
14   </subform>
```

FIG. 4

SPECIFICATION OF TABLES INCLUDING OBJECTS WITH ARBITRARY FORMATTING

BACKGROUND OF THE INVENTION

Typically, tables include a collection of rows with cells. The cells of a table are formatted so that all cells in a row have a uniform height and all cells in a column have a uniform width. Currently, such tables need to be rigidly defined. There is no allowance for tables to contain objects that are not rows and that do not adhere to formatting associated with the cells of the table. However, it may be desirable to have both row objects and "non-row" objects with arbitrary formatting included in the same table. As such, specifying other types of objects within a table would be useful.

BRIEF SUMMARY OF THE INVENTION

The specification of a table that includes one or more cells, each of which is associated with a row and a column, as well as one or more objects with arbitrary formatting is disclosed. In some embodiments, a common formatting is inferred and/or applied to the cells of the table but not to any objects with arbitrary formatting included in the table.

BRIEF DESCRIPTION OF THE DRAWINGS

Various embodiments of the invention are disclosed in the following detailed description and the accompanying drawings.

FIG. 1 illustrates an embodiment of a table object that includes both row and non-row objects.

FIG. 4 illustrates example pseudocode associated with realizing table 100 of FIG. 1 with a single table object.

DETAILED DESCRIPTION

Figure 2:
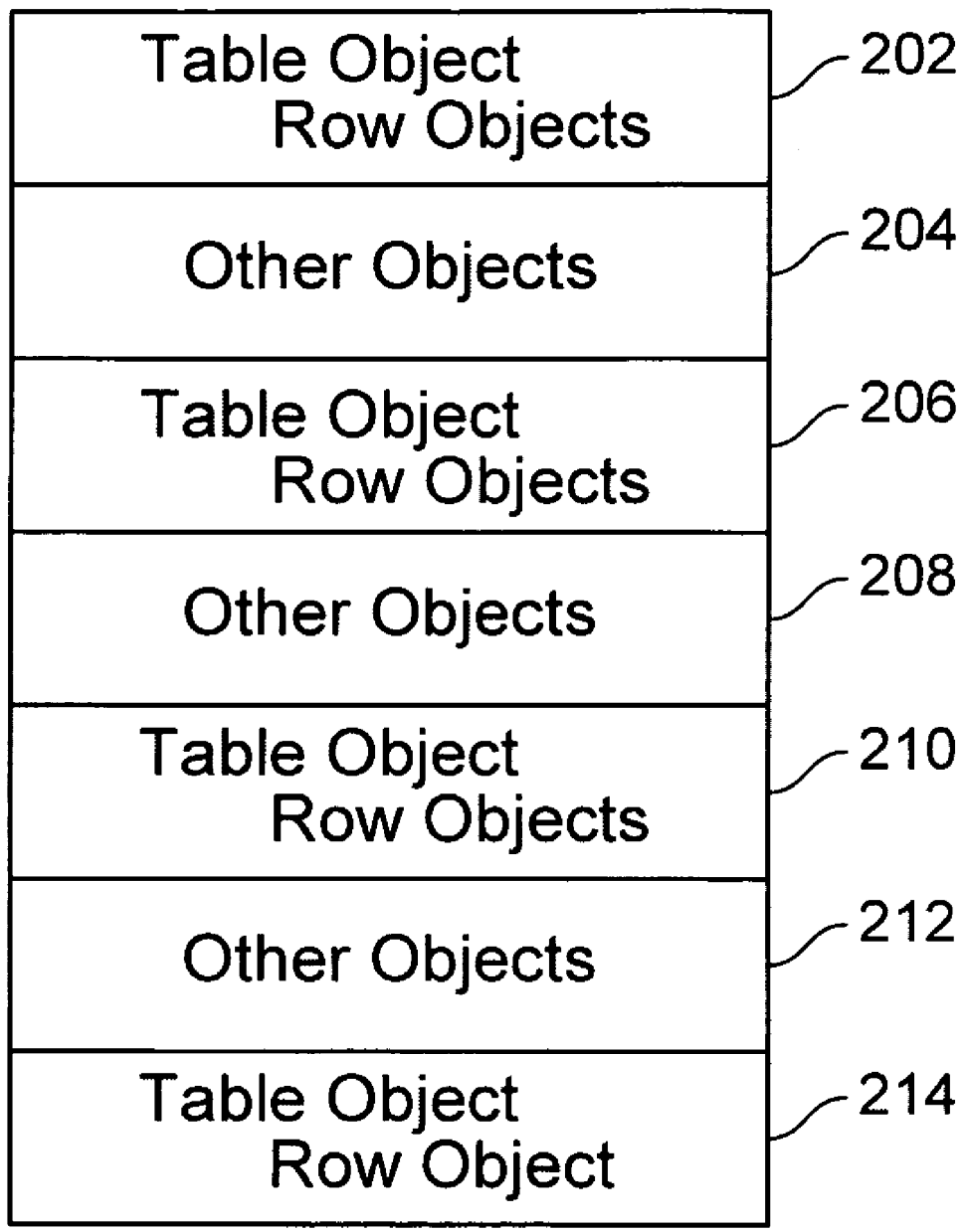
FIG. 2 illustrates an example of the manner in which the combination of row and non-row objects of FIG. 1 may be defined in some embodiments.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Specification of tables containing objects is disclosed. In some embodiments, a table object contains one or more row objects as well as one or more objects with arbitrary (i.e. non-row) formatting. Common row and/or column formatting may be inferred and applied to objects associated with rows but not to objects associated with arbitrary formatting. In some embodiments, such a table may be implemented using XFA (XML Forms Architecture), an application of XML (Extensible Markup Language) developed by Adobe Systems Incorporated.

FIG. 1 illustrates an embodiment of a table object that includes both row and non-row objects.

XFA provides the grammar to model and build electronic forms and the specific requirements for applications that use the forms. To an end user of a form, the form represents something to be filled out, for example, by entering data into fields, selecting radio buttons, checking boxes, etc. To a designer of a form, the form represents a means for capturing, rendering, and/or manipulating data. Consequently, the form designer is concerned with issues such as layout, interaction, and processing. The form designer creates a template that specifies the rules that will apply to all form instances created from that template.

The content of a form is enclosed within container objects. Containers determine the layout and formatting of the form content and may include draw, field, area, and subform objects. As used herein, the term "object" refers to an object, container, or other similar structure. A draw object is associated with the boilerplate of the form. A field object represents a data entry region. Draw and field objects are containers for static and dynamic content, respectively. As instances of forms are created from a common template, the static content is generally the same across all instances while the dynamic content is likely to change from instance to instance. An area object is a grouping of container objects that provides a form designer means for organizing a subset of objects on a form, so that they may be moved or manipulated as a whole. Similar to an area object, a subform object is a grouping of container objects. A form (or form template) is a collection of subforms, each of which represents a distinct section or subsection of the form. An area object is a static container of other containers while a subform object is a dynamic container of other containers.

The formatting strategy of child objects (or containers) contained within a parent subform container may be specified by a layout attribute associated with the parent subform container. Examples of values the layout attribute may take include "tb" (top-bottom), "lr-tb" (left-right top-bottom), "rl-tb" (right-left top-bottom), "position", "table", and "row". The child objects of a parent subform container are flowed in a direction proceeding from top to bottom if the layout attribute associated with the parent subform container is "tb". The child objects of a parent subform container are flowed in a direction proceeding from left to right and top to bottom if the layout attribute associated with the parent subform container is "lr-tb". Likewise, the child objects of a parent subform container are flowed in a direction proceeding from right to left and top to bottom if the layout attribute associated with the parent subform container is "rl-tb". If the layout attribute is "position", a child object of a parent subform container may be positioned according to an offset vector (an (x,y) pair) associated with the child object that determines the location of the contained object with respect to its container. If the layout attribute of the parent subform container is "table", child objects contained within the parent subform container that are inferred to be cells of the table may be automatically aligned or formatted into rows and columns. A table subform represents an entire table and contains everything in the table. The child objects of a table subform are typically, but not limited to be as described hereinafter, row subforms. Thus, a subform with layout attribute "row" specifies a child object of a table subform. The row subform represents one row of a table and contains everything in the row. If a row subform is not found nested inside a table subform, it may be treated as a one-row table.

A form may include one or more tables. In XFA, a table is hierarchically defined and may include one or more row subforms, each of which is a child subform of the parent table subform, as described above. Each row subform contains child objects (or containers) which correspond to the cells or columns of the table within the given row. In some embodiments, the cells are explicitly declared. In some embodiments, one or more geometric properties associated with the table are explicitly defined by the designer. In some embodiments, the actual structure and size of the table may be inferred from the set of rows and the set of objects nested within the rows and, thus, may be left underspecified by the form designer. Therefore, geometric properties of the table such as table size, number of rows, number of columns, row heights, column widths, etc., are not required to be pre-determined and explicitly defined by the form designer. Rather, such table properties can be inferred, for example, from the contents that populate the table. A designer hierarchically declares a table subform with one or more row subforms nested within the table subform and one or more objects (e.g., draw, field, area, subform with positioned or flowed layout, etc.) nested within each row subform. The objects nested within each row subform are automatically inferred as cells of the row without an explicit cell declaration by the designer. The dimensions of the inferred cells may be adaptive and dynamic based on the content that is used to populate the cells, e.g., content retrieved from one or more associated databases. In some embodiments, the dimensions of the cells are automatically formatted, so that the parent table has aligned rows and columns. Specifically, all cells in a row are formatted to have a uniform height, and all cells in a column are formatted to have a uniform width. In some embodiments, formatting other than row and/or column formatting is applied to the cells of the table, if applicable.

The number of rows within a table is inferred from the total number of child row subforms contained within the parent table subform. The objects (i.e. cells) nested within each row subform are used to infer other implied tabular information, and all cells are formatted accordingly. Specifically, the number of columns in the table is equal to the maximum number of cells in any row. The height of each row is equal to the maximum cell height in that row. If not pre-specified with the table subform declaration, the width of each column is equal to the width of the widest nth object in each row.

The designer may optionally supply a list of column widths with the table subform declaration using the columnWidths attribute. The columnWidths attribute is a space delimited list of measurements wherein the nth entry represents the width of the nth column. Column widths may be specified using a placeholder value such as "−1" (e.g., columnWidths="1 in −1 −1 2 in") that indicates that the width of the corresponding column is automatically formatted to the maximum cell width in that column. If no list of column widths is supplied, all columns widths default to "−1". Similarly, the widths of any columns that are not present in the list (that is, beyond the length of the list) default to "−1".

When defining a table, different rows may have different numbers of cells (i.e. columns). It is possible to make an individual cell of a row span more than one column using the colSpan attribute. The colSpan attribute specifies the number of columns spanned by an object (i.e. cell) contained within a row subform and has a default value of "1" (i.e. one column). For example, if colSpan is set to a positive integer, the cell spans that many columns. Alternatively, colSpan may be set to a predetermined value such as "−1" that indicates that the cell spans all the remaining columns of the table, and if additional cells follow after that cell, the subsequent cells are not displayed. If a column is unconstrained (i.e. a column width for that column is not specified using the column-Widths attribute of the table subform), the table is well-defined if one cell in the unconstrained column does not span multiple columns. However, if any given unconstrained column contains only cells that span multiple columns, the table is not well-defined and the resulting layout may depend on the implementation.

In a table, the rows are vertically laid out in the order in which they are declared from first to last, and the cells in each row are horizontally laid out in the order in which they are declared from first to last. Cell sizes are adjusted to align the table. For each row, cells are vertically expanded to the height of the tallest cell in the row, resulting in vertical alignment of the row. Cells in each column are horizontally expanded to a designated width if specified in the columnWidths attribute of the table subform. If a placeholder (e.g., "−1") is specified in the columnWidths attribute and/or in the absence of a columnWidths attribute, the cells in each column are horizontally expanded to the width of the widest cell in the column. All cells in a column assume a uniform column width. A cell may assume multiple column widths as dictated by a colSpan attribute associated with the cell. If a row does not have as many cells as other rows, an empty region may exist to the right of that row.

Tables are typically defined as a collection of rows with cells (columns). In some embodiments, the table subform in XFA includes one or more non-row child subform(s) that is/are exempt from the formatting rules associated with the rows and columns of the parent table. Tables containing objects with arbitrary (i.e. non-row) formatting is disclosed herein.

In XFA, child objects (or containers) nested within a parent table object (or container) are not constrained to be of layout type "row". In some embodiments, a table subform contains arbitrarily nested child subforms with non-row layout types, e.g., "tb", "lr-tb", "rl-tb", "position". The non-row subforms are part of the overall table flow and may be declared anywhere within the table definition. As such, non-row subforms may be inserted before and/or after row subforms of the table. However, unlike the objects contained in row subforms, objects contained in non-row subforms are not inferred as cells of the parent table and, therefore, are not subjected to alignment in height and/or width. Rather, these objects are formatted independently from the cells of the table based on the value assigned to the layout attribute associated with the non-row subform in which they are contained. For example, the objects contained in a non-row subform may be positioned, flowed top-bottom, flowed left-right top-bottom, or flowed right-left top-bottom if the layout attribute of the non-row subform is "position", "tb", "lr-tb", or "rl-tb", respectively. The non-row subforms contained in a table subform may be arbitrarily sized and consequently may be shorter or longer than the rows in the table. The non-row subforms contained in the table allow for flexible, non-standard entries inside the table such as information sections, disclaimers, etc. Although they are immune from conforming to any row heights and/or column widths, the objects associated with non-row subforms are still considered part of the outer table object, e.g., for hit-testing, table bounds, z-ordering, tagging (accessibility), etc. In XFA, tables may also be nested. A table may be a direct child of another table subform, or a table can be nested within a row or non-row subform and/or a descendent of a row or non-row subform.

Returning to FIG. 1, portion 102 of table 100 corresponds to the first four rows of table 100. Each row of table 100 is defined by a corresponding row subform. Each row subform contains one or more objects which form the cells of table 100. The first row of table 100 contains one cell that spans all columns of the table. The second, third, and fourth rows of table 100 each contain three cells. Portion 104 of table 100 corresponds to a non-row object that is defined by a subform with "position" layout. The objects contained within this non-row subform are positioned according to offset vectors (x,y) associated with the contained objects. Portion 106 of table 100 corresponds to the fifth and sixth rows of the table, each of which contains three cells. Portion 108 of table 100 corresponds to a non-row object that is defined by a subform with "tb" layout in which the contained objects are flowed from top to bottom. Portion 110 of table 100 corresponds to the seventh and eighth rows of the table, each of which contains three cells. Portion 112 of table 100 corresponds to a non-row object that is defined by a subform with "lr-tb" layout in which the contained objects are flowed from left to right, top to bottom. Portion 114 of table 100 corresponds to the ninth row of the table which includes two cells with the second cell spanning two columns.

The objects contained in the non-row portions of table 100 (i.e. 104, 108, and 112) do not conform to the row and column alignment that the rest of the cells of table 100 are subjected to. Moreover, these objects are immune to subsequent formatting changes made to the cells of the table. For example, if the width of the third column of table 100 is increased, the widths of the cells in the third column of all rows of table 100 are accordingly increased while the objects associated with the non-row portions of the table remain unaffected.

FIG. 2 illustrates an example of the manner in which the combination of row and non-row objects of FIG. 1 may be defined in some embodiments. In some embodiments, the overall presentation of row and non-row objects as illustrated in FIG. 1 may be realized without nesting non-row objects within a table. 202, 204, 206, 208, 210, 212, and 214 of FIG. 2 correspond to 102, 104, 106, 108, 110, 112, and 114 of FIG. 1, respectively. If there is no allowance for other (i.e. non-row) objects to be nested within a table object, multiple tables are declared to achieve a presentation analogous to FIG. 1. Each of the table objects, 202, 206, 210, and 214, is distinct with independent formatting. Columns from one table object do not automatically align with columns from another table object. The designer needs to ensure that proper alignment results if it is desired that the different table objects are to appear as parts of the same table to an end user. Moreover, subsequent modifications that affect alignment, such as changing a column width, must be individually made to each table object. Similarly, any operation desired to be performed on the entire group of objects of FIG. 2 must be individually performed on 202-214.

Figure 3:
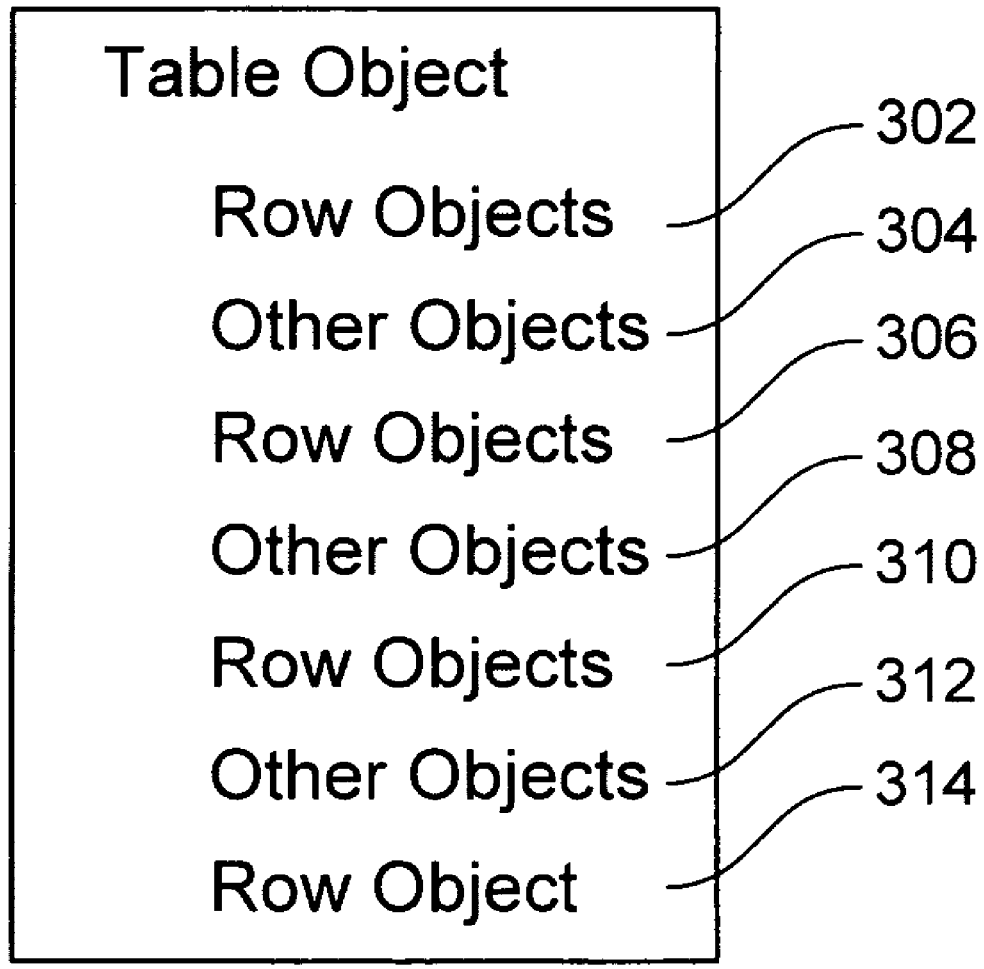
FIG. 3 illustrates an embodiment of the manner in which the combination of row and non-row objects of FIG. 1 are nested within a single table object.

FIG. 3 illustrates an embodiment of the manner in which the combination of row and non-row objects of FIG. 1 are nested within a single table object. 302, 304, 306, 308, 310, 312, and 314 of FIG. 3 correspond to 102, 104, 106, 108, 110, 112, and 114 of FIG. 1, respectively. The row and other (i.e. non-row) objects are contained within the same table object. Common row and/or column formatting applies to all objects associated with the rows, and similarly any subsequent formatting modifications apply to all objects associated with the rows. The other, non-row objects remain immune to row and/or column formatting but still flow with and are contained within the table object. Any operation desired to be performed on objects associated with both the row and other objects may be applied to the parent table object.

FIG. 4 illustrates example pseudocode associated with realizing table 100 of FIG. 1 with a single table object. The table object is declared in line 1 as a subform with "table" layout and a set of fixed columns widths-2 inches, 3 inches, and 1 inch for the first, second, and third columns, respectively, as defined by the columnWidths attribute. The first four rows of table 100, which correspond to portion 102 of FIG. 1, are declared in lines 2-5 as subforms with "row" layout. The row subforms each contain one or more child objects, each of which is inferred as a cell of the table without an explicit cell declaration. For example, the pseudocode associated with line 2 defines the first row, which contains a single cell that spans all columns, and may be further expanded to illustrate the nesting of the object inferred as a cell as follows:

<subform layout="row" name="row1">
<draw name="cell1" colSpan="-1" . . . />
</subform>

Lines 3, 4, and 5 define the second, third and fourth rows of table 100, respectively. Each of these rows contains three cells as depicted in FIG. 1. The pseudocode associated with line 5, for example, may be further expanded to illustrate the nesting of objects inferred as cells as follows:

<(subform layout="row" name="row4")>
<field name="cell1" . . . />
<area name="cell2" . . . />
<draw name="cell3" . . . />
</subform>

Portion 104 of FIG. 1 corresponds to a non-row object of table 100 which is defined in line 6 as a subform with "position" layout. The non-row subform contains nested objects. These nested objects are not inferred as cells of the parent table since they are not nested within a row subform and, therefore, do not conform to any alignment or formatting associated with the cells. The pseudocode associated with line 6 may be further expanded to illustrate the nesting of objects as follows:

<subform layout="position" name="information">
<draw name="information" x=[a number] y=[a number] . . . />
<draw name="name" x=[a number] y=[a number] . . . />
<draw name="phone" x=[a number] y=[a number] . . . /
<draw name="birth" x=[a number] y=[a number] . . . />
<draw name="office_only" x=[a number] y=[a number] . . . />
<field name="name" x=[a number] y=[a number] . . . />
<field name="phone" x=[a number] y=[a number] . . . /
<field name="birth" x=[a number] y=[a number] . . . />
</subform>

The fifth and sixth rows of table 100, which correspond to portion 106 of FIG. 1, are defined by lines 7 and 8, respectively, as subforms with "row" layout. As depicted in FIG. 1, both of these rows contain three cells. The pseudocode illustrating the manner in which objects that are inferred as cells are nested in the rows is similar to that described for line 5. Portion 108 of FIG. 1 corresponds to another non-row object of table 100 which is defined in line 9 as a subform with "tb" layout. The objects nested in this subform are laid out from top to bottom as specified by the layout attribute. The nested objects are not inferred as cells of the parent table since they are not nested within a row subform and, therefore, do not conform to any alignment or formatting associated with the cells. The pseudocode associated with line 9 may be further expanded to illustrate the nesting of objects within this subform as follows:

```
<subform layout="tb" name="detail">
    <subform name="detail_line">
    <subform name="detail_line">
    <subform name="detail_line">
    <subform name="detail_line">
</subform>
```

The seventh and eighth rows of table 100, which correspond to portion 110 of FIG. 1, are defined by lines 10 and 11, respectively, as subforms with "row" layout. As depicted in FIG. 1, each of these rows contains three cells. The pseudocode illustrating the manner in which objects that are inferred as cells are nested in these rows is similar to that described for line 5. Portion 112 of FIG. 1 corresponds to another non-row object of table 100 which is defined in line 12 as a subform with "lr-tb" layout. The objects nested in this subform are laid out from left to right, top to bottom. The nested objects are not inferred as cells of the parent table since they are not nested within a row subform and, therefore, do not conform to any alignment or formatting associated with the cells. The pseudocode associated with line 12 may be further expanded to illustrate the nesting of objects within this subform as follows:

```
<subform layout="lr-tb" name="data">
    <field name="field1" . . . />
    <draw name="static_text1" . . . />
    <field name="field2" . . . /
    <field name="field3" . . . />
    <field name="field4" . . . />
    <field name="field5" . . . />
    <field name="field6" . . . /
    <draw name="static_text2" . . . />
    <field name="field7" . . . /
</subform>
```

The ninth row of table 100, which corresponds to portion 114 of FIG. 1, is defined by line 13 as a subform with "row" layout. As depicted in FIG. 1, the row contains two cells, with the second cell spanning two columns. The pseudocode illustrating the manner in which objects that are inferred as cells are nested in this row is similar to that described for line 5 with the exception that only two nested objects are included and the second nested object has attribute "colSpan=–1" or "colSpan=2". The table definition ends at line 14. The objects nested within both row and non-row subforms are defined in an analogous manner, but only the objects nested within rows are inferred as cells. The objects associated with the rows (i.e. 102, 106, 110, 114 of FIG. 1) are automatically formatted so that all cells in a row have a uniform height and all cells in a column have a uniform width wherein the column widths in this example are determined by the columnWidths attribute specified with the table object. The name attributes specified in the pseudocode of FIG. 4 and herein are arbitrary and for illustrative purposes only. No meaning or layout behavior of any associated objects is implied from the particular choices of the names. The pseudocode presented in FIG. 4 and discussed herein is provided to illustrate one embodiment in which a hierarchical table with both row and non-row objects may be defined and in no way limits the actual implementation of such a table.

Figure 5:
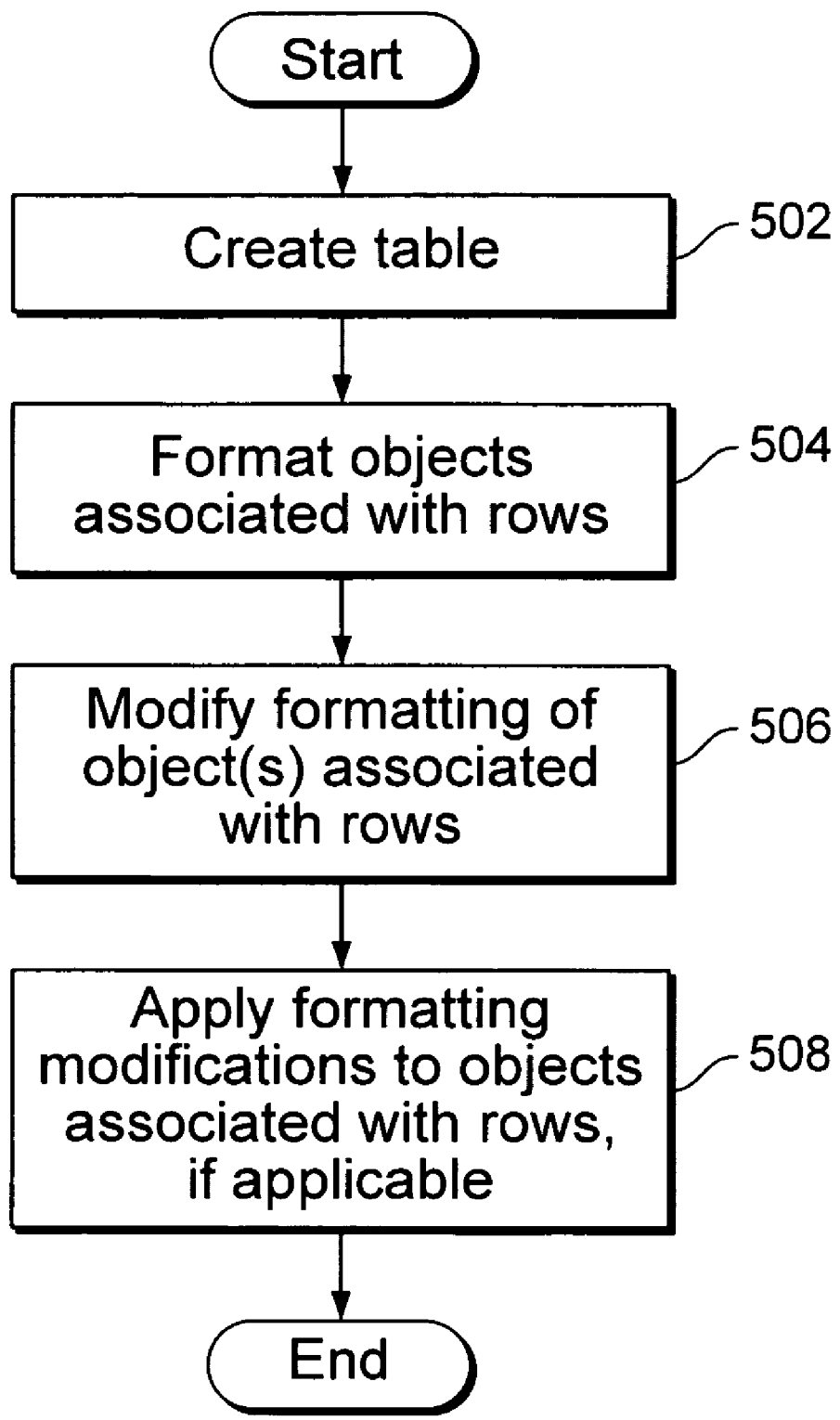
FIG. 5 illustrates an embodiment of a process for creating a table in which only objects associated with rows are subjected to row and/or column formatting.

FIG. 5 illustrates an embodiment of a process for creating a table in which only objects associated with rows are subjected to row and/or column formatting. At 502, a table is created. In some embodiments, the table object is defined by hand coding the table. In some embodiments, a table object is created using a user interface. The source code of the table includes a single table object with one or more nested row and non-row objects. One or more objects are further nested in the row and non-row objects. At 504, the objects associated with the rows are formatted. The objects contained in the row objects are inferred as cells of the table. In some embodiments, the cells of the table are formatted so that rows and columns of the table are aligned. In some embodiments, table formatting is inferred from the data used to populate the cells. Vertical alignment may be achieved by vertically expanding each cell to the height of the tallest cell in the row. Horizontal alignment may be achieved by horizontally expanding each column to a designated width specified with the table object or in the absence of a designated width, to the width of the widest cell in the column. At 506, the formatting of one or more objects associated with the rows is modified. For example, the height or width of a cell may be increased, the data used to populate one or more cell(s) may change, etc. At 508, the formatting modifications of 506 are applied to objects associated with the rows, if applicable. For example, if the width of a cell is increased at 506, the width of that column in all rows may be accordingly increased at 508 to maintain a uniform column width. If the height the tallest cell in a row is increased at 506, the height of all other cells in the row may be increased at 508 to maintain a uniform row height, for instance. 506 and 508 may repeat each time cell formatting is modified.

Figure 6:
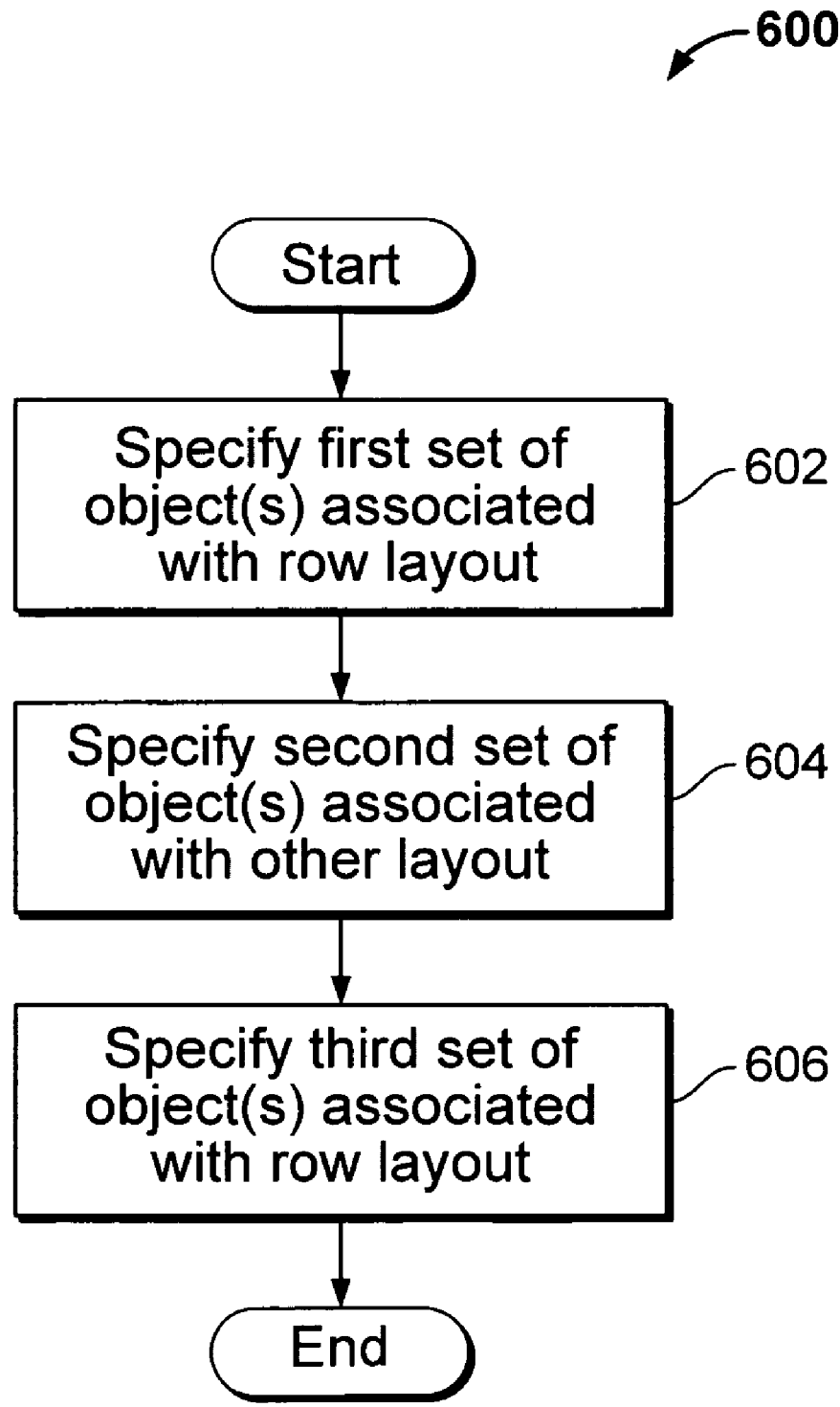
FIG. 6 illustrates an embodiment of a process for creating a table with both row and non-row objects.

FIG. 6 illustrates an embodiment of a process for creating a table with both row and non-row objects. In some embodiments, process 600 is employed at 502 of FIG. 5. At 602, a first set of one or more objects associated with row layout is specified. The object(s) in the first set is/are inferred as cell(s) of a row. At 604, a second set of one or more objects associated with an other (i.e. non-row) layout is specified. In some embodiments, the other layout is positioned layout. In some embodiments, the other layout is flowed layout, e.g., top-bottom, left-right top-bottom, right-left top-bottom, etc. At 606, a third set of one or more objects associated with row layout is specified. The object(s) in the third set is/are inferred as cell(s) of a row. In some embodiments, the first, second, and third sets can be specified in any order.

As described herein, hierarchical tables may be defined to contain both row and non-row objects. Table properties, such as number of rows, number of columns, row heights, column widths, etc., may be inferred from the row objects and the set of objects nested within the rows. Only the objects associated with rows (i.e., the cells) are subjected to common row and/or column formatting so that all cells in a row have a uniform height and all cells in a column have a uniform width. The objects associated with non-row objects remain immune to such formatting. Non-row objects are still part of the table object and flow amongst the rows of the table.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

creating a form, wherein the creating the form includes specifying a table that includes a plurality of row objects and a plurality of non-row objects, wherein each of the plurality of non-row objects includes arbitrary formatting, and wherein the creating the form includes:

specifying a first container in the table that includes a first set of one or more objects in the table using a processor, wherein specifying the first container includes specifying a first layout attribute associated with the first container that includes a row layout and indicates that the first set of one or more objects contained in the first container is formatted as a row object of the table;

specifying a second container in the table that includes a second set of one or more objects in the table, wherein specifying the second container includes specifying a second layout attribute associated with the second container wherein the second layout attribute includes a position layout and is not associated with row formatting and indicates that the second set of one or more objects contained in the second container is formatted as a non-row object of the table; and specifying a third container in the table that includes a third set of one or more objects in the table, wherein specifying the third container includes specifying a third layout attribute associated with the third container that includes a row layout and indicates that the third set of one or more objects contained in the third container is formatted as a row object of the table, wherein the second set of one or more objects in the table are between the first set of one or more objects in the table and the second set of one or more objects in the table;

wherein a common row formatting is applied to the objects associated with the row objects but not to the objects associated with the non-row objects, wherein the objects associated with the non-row objects of the table are immune to common column formatting changes and common row formatting changes applied to any of the objects associated with the row objects of the table, wherein the objects associated with the non-row objects of the table are contained within and flow with the table, and wherein formatting changes applied to the table are applied to the plurality of row objects and the plurality of non-row objects;

wherein the table includes a plurality of columns, wherein the common row formatting is applied to the one or more columns, wherein the common row formatting includes formatting the width of each column, and wherein the objects associated with the row objects of the table are inferred as cells of the table, and wherein the common row formatting is applied such that each cell in each row of the objects associated with the row objects of the table has a uniform height and each cell in each column of the objects associated with the row objects of the table has a uniform width, and each of the cells of the table are formatted so that the rows and columns of the objects associated with the row objects of the table are automatically aligned in response to any formatting modifications.

2. The method recited in claim 1, wherein the common row formatting is specified by one or more subforms with a row layout, and wherein the non-row object is specified by a subform with a position layout, wherein the arbitrary formatting is non-row formatting.

3. The method recited in claim 1, wherein the common row formatting is applied to the one or more columns.

4. The method recited in claim 1, wherein one or more geometric properties associated with the table are automatically inferred.

5. The method recited in claim 1, further including determining that a number of row objects in the table is equal to a number of containers having layout attributes that indicate row formatting.

6. The method recited in claim 1, wherein each container of the table includes one or more objects, and further including determining that a number of columns in the table is equal to a maximum number of objects contained in any container having a layout attribute that indicates row formatting.

7. The method recited in claim 1, further including determining that each object contained in a container having a layout attribute that indicates row formatting is a cell of the table.

8. The method recited in claim 1, wherein each cell of the table is associated with a row and a column of the table.

9. The method recited in claim 1, wherein each cell of the table is associated with a row and a column of the table, and wherein each cell has a height, and the height of each cell of the table is formatted to conform to the height of the tallest cell in the row object associated with the cell.

10. The method recited in claim 1, wherein each cell of the table is associated with a row and a column of the table, and wherein each cell has a width, and the width of each cell of the table is formatted to conform to the width of the widest cell in the column associated with the cell.

11. The method recited in claim 1, wherein each cell of the table is associated with a row and a column of the table, and wherein the width of each cell of the table is formatted to conform to a set of column width attributes specified with the table that specify a fixed width for a column or an indication to size a column based on the width of the widest cell in the column.

12. The method recited in claim 1, wherein each cell of the table is associated with a row and a column of the table, and wherein a cell has an attribute that specifies the number of columns spanned by the cell.

13. The method recited in claim 1,
wherein specifying the second container includes specifying a layout attribute associated with the second container that indicates that the one or more objects contained in the second container are positioned based on a set of one or more offset vectors associated with the one or more objects.

14. The method recited in claim 1,
wherein specifying the second container includes specifying a layout attribute associated with the second container that indicates that the one or more objects contained in the second container flow from top to bottom.

15. The method recited in claim 1, wherein the first, second, and third containers can be specified in any order.

16. The method recited in claim 1, wherein the table is specified using a markup language.

17. A system for specifying a table, comprising:
a processor configured to:
create a form, wherein the creating the form includes specifying a table that includes a plurality of row objects and a plurality of non-row objects, wherein each of the plurality of non-row objects includes arbitrary formatting, including:
specify a first container in the table that includes a first set of one or more objects in the table wherein specifying the first container includes specifying a first layout attribute associated with the first container that includes a row layout and indicates that the first set of one or more objects contained in the first container is formatted as a row object of the table; and specify a second container in the table that includes a second set of one or more objects in the table, wherein specifying the second container includes specifying a second layout attribute associated with the second container wherein the second layout attribute includes a position layout and is not associated with row formatting and indicates that the second set of one or more objects contained in the second container is formatted as a non-row object of the table; and specify a third container in the table that includes a third set of one or more objects in the table, wherein specifying the third container includes specifying a third layout attribute associated with the third container that includes a row layout and indicates that the third set of one or more objects contained in the third container is formatted as a row object of the table, wherein the second set of one or more objects in the table are between the first set of one or more objects in the table and the second set of one or more objects in the table;

wherein a common row formatting is applied to the objects associated with the row objects but not to the objects associated with the non-row objects, wherein the objects associated with the non-row objects of the table are immune to common column formatting changes and common row formatting changes applied to any of the objects associated with the row objects of the table, wherein the objects associated with the non-row objects of the table are contained within and flow with the table, and wherein formatting changes applied to the table are applied to the plurality of row objects and the plurality of non-row objects;

wherein the table includes a plurality of columns, wherein the common row formatting is applied to the one or more columns, wherein the common row formatting includes formatting the width of each column, and wherein the objects associated with the row objects of the table are inferred as cells of the table, and wherein the common row formatting is applied such that each cell in each row of the objects associated with the row objects of the table has a uniform height and each cell in each column of the objects associated with the row objects of the table has a uniform width, and each of the cells of the table are formatted so that the rows and columns of the objects associated with the row objects of the table are automatically aligned in response to any formatting modifications; and a memory coupled with the processor, wherein the memory provides the processor with instructions.

18. A computer program product for specifying a table, the computer program product being embodied in a computer readable storage medium and comprising computer instructions for:

creating a form, wherein the creating the form includes specifying a table that includes a plurality of row objects and a plurality of non-row objects, wherein each of the plurality of non-row objects includes arbitrary formatting, and wherein the creating the form includes:

specifying a first container in the table that includes a first set of one or more objects in the table, wherein specifying the first container includes specifying a first layout attribute associated with the first container that includes a row layout and indicates that the first set of one or more objects contained in the first container is formatted as a row object of the table; and specifying a second container in the table that includes a second set of one or more objects in the table, wherein specifying the second container includes specifying a second layout attribute associated with the second container wherein the second layout attribute includes a position layout and is not associated with row formatting and indicates that the second set of one or more objects contained in the second container is formatted as a non-row object of the table; and specifying a third container in the table that includes a third set of one or more objects in the table, wherein specifying the third container includes specifying a third layout attribute associated with the third container that includes a row layout and indicates that the third set of one or more objects contained in the third container is formatted as a row object of the table, wherein the second set of one or more objects in the table are between the first set of one or more objects in the table and the second set of one or more objects in the table;

wherein a common row formatting is applied to the objects associated with the row objects but not to the objects associated with the non-row objects, wherein the objects associated with the non-row objects of the table are immune to common column formatting changes and common row formatting changes applied to any of the objects associated with the row objects of the table, wherein the objects associated with the non-row objects of the table are contained within and flow with the table, and wherein formatting changes applied to the table are applied to the plurality of row objects and the plurality of non-row objects;

wherein the table includes a plurality of columns, wherein the common row formatting is applied to the one or more columns, wherein the common row formatting includes formatting the width of each column, and wherein the objects associated with the row objects of the table are inferred as cells of the table, and wherein the common row formatting is applied such that each cell in each row of the objects associated with the row objects of the table has a uniform height and each cell in each column of the objects associated with the row objects of the table has a uniform width, and each of the cells of the table are formatted so that the rows and columns of the objects associated with the row objects of the table are automatically aligned in response to any formatting modifications.

19. The method recited in claim 1, further comprising:

specifying a fourth set of one or more objects in the table having an indication that the fourth set will be formatted as a non-row object of the table, wherein each of the objects associated with the second set of one or more objects and the objects associated with the fourth set of one or more objects are distinct with independent formatting.

20. The system recited in claim 17, wherein the processor is further configured to:

specify a fourth set of one or more objects in the table having an indication that the fourth set will be formatted as a non-row object of the table, wherein each of the objects associated with the second set of one or more objects and the objects associated with the fourth set of one or more objects are distinct with independent formatting.

21. The computer program product recited in claim 18, further comprising computer instructions for:

specifying a fourth set of one or more objects in the table having an indication that the fourth set will be formatted as a non-row object of the table, wherein each of the objects associated with the second set of one or more objects and the objects associated with the fourth set of one or more objects are distinct with independent formatting.

22. The computer program product recited in claim 18, wherein the common row formatting is applied to the plurality of row objects, wherein the common row formatting is specified by one or more subforms with a row layout, and wherein the non-row object is specified by a subform with a position layout, wherein the arbitrary formatting is non-row formatting.

23. The computer program product recited in claim 18, wherein the first, second, and third containers can be specified in any order, and wherein the table is specified using a markup language.

24. The system recited in claim 17, wherein the common row formatting is applied to the plurality of row objects, wherein the common row formatting is specified by one or more subforms with a row layout, and wherein the non-row object is specified by a subform with a position layout, wherein the arbitrary formatting is non-row formatting.

25. The system recited in claim 17, wherein the first, second, and third containers can be specified in any order, and wherein the table is specified using a markup language.

* * * * *